Patented Nov. 28, 1939

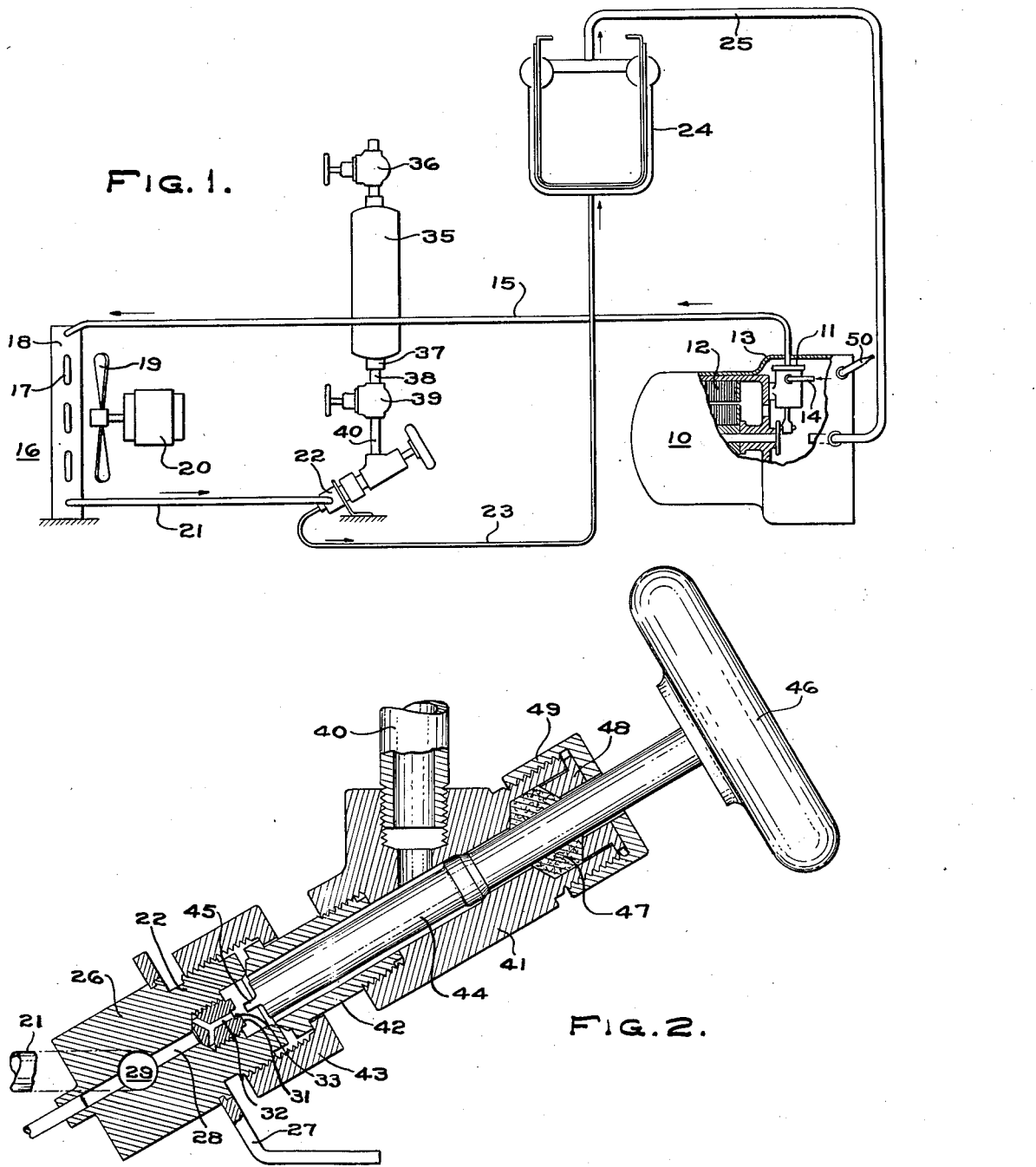

2,181,853

UNITED STATES PATENT OFFICE 2,181,853

METHOD OF CHARGING

Graham S. McCloy, East Longmeadow, Mass., assignor to Westinghouse Electric & Manufacturing Company, East Pittsburgh, Pa., a corporation of Pennsylvania Application February 23, 1938, Serial No. 191,993
Renewed October 11, 1939

11 Claims. (Cl. 62—170)

This application is a continuation-in-part of my application, Serial No. 140,011, filed April 30, 1937.

My invention relates to refrigeration apparatus, and more particularly to a method and apparatus for charging a refrigerating system with refrigerant and lubricant and for removing non-condensable gases from the system.

When charging a closed refrigerating system, it is necessary for several reasons to remove substantially all non-condensable gases, such as air, from the system. The presence of non-condensable gases in the system is objectionable for several reasons, as is well-known in the art. For example, their presence causes high head pressure in the high pressure side of the system and, hence, reduces the efficiency of the system.

Heretofore, refrigerating systems generally have been charged with liquid refrigerant by first drying the refrigerant system with warm air or inert gas and then evacuating the system with high vacuum apparatus. The apparatus for performing the evacuation portion of the process is expensive, cumbersome, and slow in operation and, furthermore, it is very difficult to completely remove the non-condensable gases from the system. In addition, the refrigerant and the lubricant with which the system is afterwards charged contain non-condensable gases which are not removed by prior evacuation.

It is an object of my invention to provide an improved method for charging a refrigerating system with refrigerant and lubricant and for removing non-condensable gases from the system.

Another object is to provide an improved method of removing non-condensable gases from a refrigerating system.

It is also an object of my invention to remove the non-condensable gases from the system by operation of the compressor of the refrigerating system and thus to dispense with expensive and cumbersome evacuating apparatus.

It is a further object of my invention to provide a method and apparatus for charging and removing non-condensable gases which may be readily used in the field for servicing refrigerating systems.

It is another object of my invention to provide a method of charging and removing non-condensable gases from a refrigerating system wherein the non-condensable gases which are contained in the refrigerant and the lubricant charge are removed from the system.

Another object is to provide a method and apparatus for charging a refrigerating system with refrigerant which readily adapts itself to accurately charging of the refrigerant by the weight thereof, which is considerably more accurate than by charging by volume.

A further object is to provide a method of charging and removing non-condensable gases that is particularly applicable to a refrigerating system including an expansion device of constant flow resistance, such as a capillary tube.

Still another object is to provide a charging method which is particularly adapted to large production methods and which may be used to charge and remove non-condensable gases from the refrigerating systems without removal from a moving conveyor assembly and test system and without stopping the conveyor.

The above and other objects are effected by my invention as will be apparent from the following description and claims taken in accordance with the accompanying drawing, forming a part of this application, in which:

Fig. 1 is a diagrammatic view of a refrigerating system to which my invention is applied; and Fig. 2 is an enlarged sectional detail view.

Referring to the drawing in detail, the refrigerating system includes a hermetically sealed motor compressor unit 10, including a compressor 11, a motor 12 for driving the compressor, and a casing 13 enclosing the motor and the compressor. The inlet of the compressor, at 14, is in communication with the interior of the casing 13, so that said interior is at compressor suction pressure. The compressed refrigerant discharged from the compressor is conveyed through a conduit 15 to a condenser 16. The latter includes a serpentine coil 17 having fins 18 for increasing the heat dissipating surface of the condenser. The condenser is cooled by a stream of air circulated over the condenser by a fan 19 driven by a motor 20, thereby condensing the compressed refrigerant in the condenser.

The condensed refrigerant is conveyed through a conduit 21 to a combination purge and charging valve 22. From the latter, the refrigerant flows through a tube of considerable length and small bore, sometimes referred to as a "capillary tube," shown at 23. As the refrigerant flows through the capillary tube 23, its pressure is gradually reduced, so that a portion of the refrigerant vaporizes. A mixture of liquid and vaporous refrigerant is, therefore, delivered by the capillary tube 23 to an evaporator 24, in which the refrigerant effects cooling action primarily by vaporization of the liquid refrigerant. The vaporized refrigerant is withdrawn from the evaporator by a suction conduit 25 and conveyed to the interior of the casing 13, from which it enters the compressor inlet 14 and repeats the cycle of operation just described.

In the refrigerating system shown in Fig. 1, the evaporator is disposed at a higher elevation than the compressor and the condenser. Such an arrangement is used, for example, in a bottom mounted refrigerator (not shown), in which the evaporator is mounted in the food compartment, and the compressor and the condenser are mounted in a machine or unit compartment disposed below the food compartment.

The combination purge and charging valve 22 is shown in detail in Fig. 2. It includes a fitting or body member 26 mounted in an inclined position in a bracket 27. It has an inclined passage 28, the lower end of which is connected to the inlet end of the capillary tube 23. The conduit 21 communicates with the passage 28, intermediate the ends thereof, as indicated at 29. The upper end of the passage 28 is adapted to be closed by a valve member 31, which is screw threaded into the fitting 26. It is formed with passages 32 for flow of refrigerant therethrough when it is retracted from the valve seat. The valve member 31 is formed with a screw driver slot or kerf 33.

In accordance with the present invention, I provide a charging drum or vessel 35 containing the necessary refrigerant charge for the refrigerating system, the charge having been carefully measured by weight. The refrigerant may be, for example, dichlorodifluoromethane, sold under the trade name of "Freon 12." The drum 35 is of sufficient size to contain, at condenser pressure and mixed with refrigerant vapor, all of the non-condensable gases which are contained in the refrigerating system at the time that the refrigerant charge is admitted thereto. The drum 35 is provided with a vent at the top, controlled by a valve 36. It has an opening 37 at the bottom, which is adapted to be connected to the combination purge and charging valve 22 through a group of fittings including a conduit 38, a valve 39, a conduit 40, a body member 41, a sleeve 42, and a nut 43 for securing the sleeve 42 to the fitting or body member 26. A screw driver stem 44, having a blade or key 45 adapted to engage the slot 33 of the valve member 31, extends through the sleeve 42 and the body member 41 and is provided with a hand wheel 46 at its outer end. The end of the body member 41 through which the stem 44 extends is closed by a packing 47, a packing gland 48 and a nut 49. It will be noted that the drum, when thus connected to the refrigeratig system, is disposed above the point of connection therewith, so that liquid may flow by gravity from the drum into the system.

After the mechanical structure of the refrigerating system is completed and before it is charged, the system is first dehydrated, which is preferably effected by subjecting the same to flow of warm dry air or an inert gas, such as nitrogen, for a sufficient time to remove substantially all the moisture from the system. After dehydration, the system, still filled with the warm air or inert gas, is placed on a conveyor (not shown) and is provided with the proper amount of lubricant through a conduit 50, which opens into the motor compressor-casing 13 and which is pinched off and sealed after lubricant charging. During this time, the system is open to the atmosphere through the valve 22, which is open; the drum 35 and the connecting fitting having not yet been attached. The pressure throughout the system is substantially at atmospheric pressure and the entire system is above room temperature, having been heated by the warm dry air or inert gas used for drying so that very little, if any, air from outside the system will enter it.

The compressor is now operated for a short period, for example, about five minutes, to effect partial evacuation of the low pressure side of the system. This operation is also known as auto-evacuation, since it is effected by operation of the refrigerant compressor. The compressor withdraws the non-condensable gases present in the low pressure side of the system, comprising mainly the warm air or inert gas used for drying, and discharges the same into the high pressure side of the system. The latter, however, is vented to the atmosphere through the valve 22 so that the pressure therein rises above atmospheric pressure only a sufficient amount to vent the gases through the valve 22. The pressure in the low pressure side of the system is reduced to about 25 inches of vacuum or lower. Thus, a substantial portion of the non-condensable gases present in the system is preliminarily removed. After the period of operation just described and while the compressor is still operating, the valve 22 is closed, and then the compressor is stopped. It will be apparent that the pressure in the high pressure side will be reduced, after the compressor is stopped, because of flow into the low pressure side through the capillary tube, and air from the atmosphere would enter the system through the valve 22 if it were not closed.

The drum 35 and the connecting fittings are mounted by screwing the nut 43 onto the body member 26. The valves 22 and 39 are then opened to permit the liquid refrigerant in the drum 35 to enter the refrigerating system.

There are several forces which may be utilized to effect flow of the liquid refrigerant into the refrigerating system, including the force of gravity, the pressure of the refrigerant in the drum 35, and the reduced pressure created in the system by operation of the compressor. In a refrigerating system arranged as shown in Fig. 1, it will be apparent that the liquid refrigerant may flow by gravity through the valve 22 into the lower portion of the condenser and also the lower portion of the capillary tube 23. Because of the higher elevation of the evaporator 24, the liquid refrigerant will not enter the evaporator by gravity flow, but a portion will enter it through the capillary tube upon opening the valves 39 and 32, because of the difference between the pressure in the purge fitting and the pressure in the evaporator.

The pressure of some refrigerants, such as "Freon 12," at ordinary atmospheric temperatures is above atmospheric pressure. In the case of "Freon 12," the pressure is sufficient to force all the liquid refrigerant into the system. A short period, such as five minutes, is preferably allowed to permit the liquid refrigerant to enter the system by gravity flow and by the pressure of the refrigerant.

Operation of the compressor is then initiated and continued for a sufficient time, such as one hour, for the purpose of collecting in the drum 35 the non-condensable gases which are contained in the system after the partial evacuation and at the time of admitting the refrigerant charge to the system. The compressor removes gaseous fluid both refrigerant vapor and non-condensable gases, from the low pressure side and discharges the same at higher pressure into the high pressure side of the system, including the condenser and the drum 35. In the condenser, most of the refrigerant is condensed, so that a mixture of liquid refrigerant and gaseous fluid, both refrigerant vapor and non-condensable gases, flows through the conduit 21 and enters the passage 28. A portion of the fluid mixture flows downwardly to the capillary tube 23, while another portion flows upwardly to the drum 35.

Because of the flow of fluid into the drum 35, the pressure therein gradually increases. As it approaches condenser pressure, the refrigerant vapor contained in the mixture begins to condense, inasmuch as the drum 35 is exposed to the ambient atmosphere which is usually at the same temperature as the air circulated over the condenser by the fan 19. The liquid refrigerant resulting from such condensation collects in the bottom of the drum 35. The condensation tends to reduce the pressure in the drum just sufficiently to effect the above-mentioned flow of the fluid mixture from the condenser to the drum. The non-condensable gases entering the drum 35 are not condensed, so that they accumulate within the drum 35 above the liquid refrigerant. Thus, there is a gradual accumulation of non-condensable gases in the drum.

After the refrigerating system has been operated for a sufficient time, such as one hour, to collect substantially all the non-condensable gases in the drum, said gases are vented from the drum by opening the valve 36. The gases may be vented directly to the atmosphere or, if desired, provision may be made for reclaiming the refrigerant vapor mixed therewith. The compressor is preferably kept running during this time. After the non-condensable gases have been removed from the drum 35, which is indicated in some instances by some liquid escaping through the vent, the valve 36 is closed. The compressor is then stopped to permit the liquid refrigerant which has re-entered the drum 35 to again enter the refrigerating system. Such flow of liquid refrigerant from the drum 35 to the capillary tube 23 and into the evaporator 24 is effected by reason of the pressure difference existing from the operation of the compressor just prior thereto. The valves 22 and 39 are then closed and the drum 35 is disconnected from the refigeating system by unscewing the nut 43. If desired, a protective cap may be screwed on to the fitting 26 to cover the valve member 31.

According to the method just described, the capacity of the drum 35 is a little greater than that necessary to hold, at condenser pressure and mixed with refrigerant vapor, those non-condensable gases which are contained in the system after the preliminary or partial evacuation of the low pressure side and at the time of admitting the refrigerant charge to the system. It is also large enough to hold the refrigerant charge when it is attached to the system. It will be apparent that the non-condensable gases cannot be obtained in the drum 35 apart from the refrigerant vapor. The refrigerant vapor exerts a partial pressure, the minimum value of which is the pressure coresponding to the ambient temperature surrounding the drum. The maximum pressure of the non-condensable gases that can be obtained is the difference between the condenser pressure in the drum and said minimum pressure of the refrigerant vapor. The size of the drum 35 must be such, therefore, as to hold the non-condensable gases at the resultant pressure just explained, and it is preferably a little larger to provide for variations in operating conditions.

According to an alternative form of the method, the preliminary or partial evacuation of the low pressure side is omitted and the drum 35 is made of sufficient size to hold, at condenser pressure, and mixed with refrigerant vapor, all of the air or other non-condensable gases which are contained in the system at atmospheric pressure at the time of charging. In this case, after dehydration and while the system contains air or other gases at atmospheric pressure, the drum 35 is connected. The valves 22 and 39 are opened to permit the refrigerant to enter the system. Pressure is built up in the condenser more rapidly in this case, due to the greater quantity of air or gas contained in the low pressure side. This gas is collected in the drum 35 during operation of the compressor in the same manner as described above. After operating for a sufficient period of time to collect the non-condensable gases in the container 35, the valve 36 is opened to vent the same to atmosphere.

While I have shown my invention in but two forms, it will be obvious to those skilled in the art that it is not so limited but is susceptible of various other changes and modifications without departing from the spirit thereof, and I desire, therefore, that only such limitations shall be placed thereupon as are imposed by the prior art or as are specifically set forth in the appended claims.

What I claim is:

1. The method of charging and removing non-condensable gases from a refrigerating system including a compressor, a condenser, and an expansion device, which method comprises connecting a container containing liquid refrigerant to the refrigerating system intermediate the condenser and the expansion device with the container disposed above the connection, admitting liquid refrigerant from the container to the refrigerating system, operating the compressor to collect non-condensable gases in the container, venting said non-condensable gases from the container adjacent the top thereof while the compressor is operating, shutting off communication between the refrigerating system and the container, and disconnecting the container from the refrigerating system.

2. The method of charging and removing non-condensable gases from a refrigerating system having a capillary tube, which comprises partially evacuating the refrigerating system by operating the same while venting gaseous fluid from the high pressure side of the system, connecting a container containing a refrigerant charge to the refrigerating system intermediate the condenser and the capillary tube in such manner that the interior of the container is disposed above the connection, admitting the refrigerant charge from the container to the refrigerating system, operating the refrigerating system to collect the non-condensable gases in said container, venting the non-condensable gases from said container adjacent the top thereof while the system is operating, terminating operation of the refrigerating system, permitting the liquid refrigerant in the container to drain into the refrigerating system, and then disconnecting the container from the refrigerating system.

3. The method of charging and removing non-condensable gases from a refrigerating system having an expansion device of constant flow resistance, which comprises connecting a container containing a refrigerant charge to the refrigerating system intermediate the condenser and the expansion device in such manner that the interior of the container is disposed above the connection, admitting the refrigerant charge from the container to the refrigerating system, operating the refrigerating system to collect the non-condensable gases in said container, venting the non-condensable gases from said container adjacent the top thereof while the system is operating, terminating operation of the refrigerating system, permitting any liquid refrigerant in the container to enter the refrigerating system, and then disconnecting the container from the refrigerating system.

4. The method of charging and removing non-condensable gases from a refrigerating system including a capillary tube, which method comprises partially evacuating the low pressure side of the system by operating the compressor while venting the high pressure side of the system, connecting a container to the refrigerating system between the condenser and the capillary tube and disposing the container above the connection, admitting a refrigerant charge to the refrigerating system, operating the compressor for a period of time sufficient to collect non-condensable gases in the container, venting said gases from the container adjacent the top thereof while the compressor is running, terminating operation of the compressor to permit any liquid refrigerant in the container to flow into the refrigerating system, and disconnecting the container from the refrigerating system.

5. The method of charging and removing non-condensable gases from a refrigerating system including an expansion device of constant flow resistance, which method comprises connecting to the refrigerating system intermediate the condenser and the expansion device, a container containing a refrigerant charge for the system and of a size sufficient to hold, at condenser pressure and mixed with refrigerant vapor, all of the non-condensable gases contained in the system at atmospheric pressure, admitting the refrigerant charge from the container to the refrigerating system, operating the compressor for a period of time sufficient to collect the non-condensable gases in the container, terminating operation of the compressor to permit any liquid refrigerant in the container to flow into the refrigerating system, and disconnecting the container from the refrigerating system.

6. The combined method of charging a refrigerating system and effecting the removal of the non-condensable gases initially contained therein, said system including a compressor, which method comprises charging the system with refrigerant while the system contains non-condensable gases, establishing communication between the high pressure side of the system and a container connected thereto and of a size sufficient to hold, at condenser pressure and mixed with refrigerant vapor, the non-condensable gases contained in the system during said charging and disposing said container above the point of its connection to the system, operating the compressor to effect flow of a mixture of non-condensable gases and refrigerant vapor at substantially condenser pressure into said container, which said container is maintained at sufficiently low temperature to condense said refrigerant vapor at condenser pressure, for a period of time sufficient to collect the non-condensable gases in said container, the refrigerant condensed in said container being drained by gravity into the system, shutting off communication between the refrigerating system and said container, and disconnecting said container from the system.

7. The combined method of charging a refrigerating system and effecting the removal of the non-condensable gases initially contained therein, said system having high and low pressure sides and including an evaporator, a compressor, a condenser, and an expansion device, which method comprises charging the system with refrigerant while the system contains non-condensable gases, establishing communication between the high pressure side of the system and a container connected thereto and of sufficient size to hold, at condenser pressure and mixed with refrigerant vapor, the non-condensable gases contained in the system during said charging, transferring said non-condensable gases from the system to the container by operating the compressor to effect flow of a mixture of non-condensable gases and refrigerant vapor at substantially condenser pressure into the container, and condensing refrigerant vapor from said mixture in the container and returning the condensed refrigerant to the system, the work of removing the non-condensable gases initially contained in the system being performed by said compressor whereby the necessity for connecting the system to separate evacuating apparatus is dispensed with.

8. The method of removing non-condensable gases from and charging a refrigerating system having high and low pressure sides and including a compressor, which method comprises charging the system with refrigerant while the system contains a substantial quantity of non-condensable gases, establishing communication between the high pressure side of the system and a container connected thereto, effecting the removal of the non-condensable gases initially contained in the system by operation of the compressor, transferring at least a portion of said non-condensable gases initially contained in the system to the container by said compressor operation effecting a flow of a mixture of non-condensable gases and refrigerant vapor at substantially condenser pressure into the container, and condensing refrigerant vapor from the mixture in the container and returning the condensed refrigerant to the system, said non-condensable gases exerting a pressure substantially equal to atmospheric pressure when the compressor begins the work of removing such gases from the system.

9. The combined method of charging a refrigerating system and effecting the removal of non-condensable gases initially contained therein, said system having high and low pressure sides and including an evaporator, a motor-compressor unit including a compressor, a motor driving the same, and a fluid-tight casing containing refrigerant vapor and enclosing the motor and the compressor, a condenser, and an expansion device, which method comprises charging the system with refrigerant while the system contains non-condensable gases, establishing communication between the system and a container connected thereto, transferring said non-condensable gases from the system to the container by operating the compressor to effect flow of a mixture of non-condensable gases and refrigerant vapor into the container, and condensing refrigerant vapor from the mixture in the container and returning the condensed refrigerant to the system.

10. The method of removing non-condensable gases from a refrigerating system having high and low pressure sides and including an evaporator, a compressor, a condenser, and a constantly open flow-controlling device of fixed restriction for regulating the flow of refrigerant between the condenser and the evaporator, which method comprises establishing communication between the system and a container having a single connection with the refrigerating system, at a point between the condenser and the expansion device, where a mixture of liquid refrigerant and gaseous fluid is flowing, transferring non-condensable gases from the system to the container by operating the compressor and effecting flow of a mixture of liquid refrigerant and gaseous fluid, both refrigerant vapor and non-condensable gases from the system into said container, condensing refrigerant vapor from the gaseous fluid in the container, collecting liquid refrigerant in the container, terminating operation of the compressor, returning the liquid refrigerant in the container to the system through said single connection while the compressor is shut down, and then closing communication between the container and the system.

11. The method of removing non-condensable gases from a refrigerating system having high and low pressure sides and including an evaporator, a compressor, a condenser, and a constantly open flow-controlling device of fixed restriction for regulating the flow of refrigerant between the condenser and the evaporator, which method comprises establishing communication between the system and a container having a single connection with the refrigerating system, at a point between the condenser and the expansion device, where a mixture of liquid refrigerant and gaseous fluid is flowing, transferring non-condensable gases from the system to the container by operating the compressor and effecting flow of a mixture of liquid refrigerant and gaseous fluid, both refrigerant vapor and non-condensable gases, from the system into said container, condensing refrigerant vapor from the gaseous fluid in the container, collecting liquid refrigerant in the container, venting non-condensable gases from the upper portion of the container, terminating operation of the compressor, returning the liquid refrigerant in the container to the system through said single connection while the compressor is shut down, and then closing communication between the container and the system.

GRAHAM S. McCLOY.